United States Patent [19]

Hettich et al.

[11] Patent Number: 4,790,179
[45] Date of Patent: Dec. 13, 1988

[54] DETECTOR OF INFLATION PRESSURE OF TIRES OF A VEHICLE

[75] Inventors: Gerhard Hettich, Dietenhofen; Lothar Haas, Stein; Hans-Dieter Schmid, Nürnberg, all of Fed. Rep. of Germany

[73] Assignee: Robert Bosch GmbH, Stuttgart, Fed. Rep. of Germany

[21] Appl. No.: 105,301
[22] PCT Filed: Nov. 5, 1986
[86] PCT No.: PCT/DE86/00443
 § 371 Date: Aug. 7, 1987
 § 102(e) Date: Aug. 7, 1987
[87] PCT Pub. No.: WO87/03545
 PCT Pub. Date: Jun. 18, 1987

[30] Foreign Application Priority Data
Dec. 12, 1985 [DE] Fed. Rep. of Germany ....... 3543865

[51] Int. Cl.⁴ .............................................. B60C 23/04
[52] U.S. Cl. ..................................... 73/146.5; 340/58
[58] Field of Search ......................... 73/146.5; 340/58; 336/30

[56] References Cited

U.S. PATENT DOCUMENTS

| | | | |
|---|---|---|---|
| 4,148,008 | 4/1979 | Lusk et al. | 340/58 |
| 4,180,795 | 12/1979 | Matsuda et al. | 340/58 |
| 4,254,398 | 3/1981 | Matsuda et al. | 340/58 |

Primary Examiner—Donald O. Woodiel
Attorney, Agent, or Firm—Michael J. Striker

[57] ABSTRACT

A tire pressure detector for motor vehicles which is to be fastened at the circumference of a wheel rim and comprises an oscillating circuit having coupling coil which cooperates with a stationary receiver coil. In order to increase the minimum air gap between the rotating coupling coil and the stationary receiver coil, the coupling coil, which rotates with the wheel rim, is arranged on a middle limb of a plate-shaped ferrite core. The magnetic coupling for the stationary receiver coil is improved by means of the shape of the ferrite core (23).

4 Claims, 1 Drawing Sheet

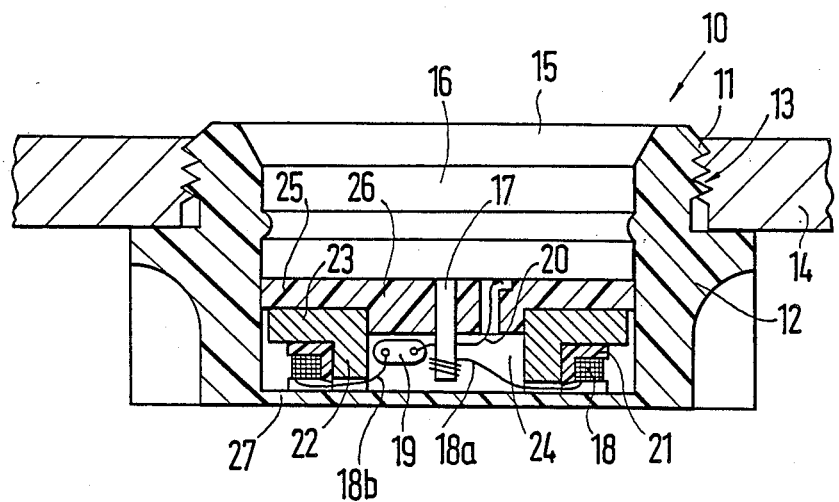
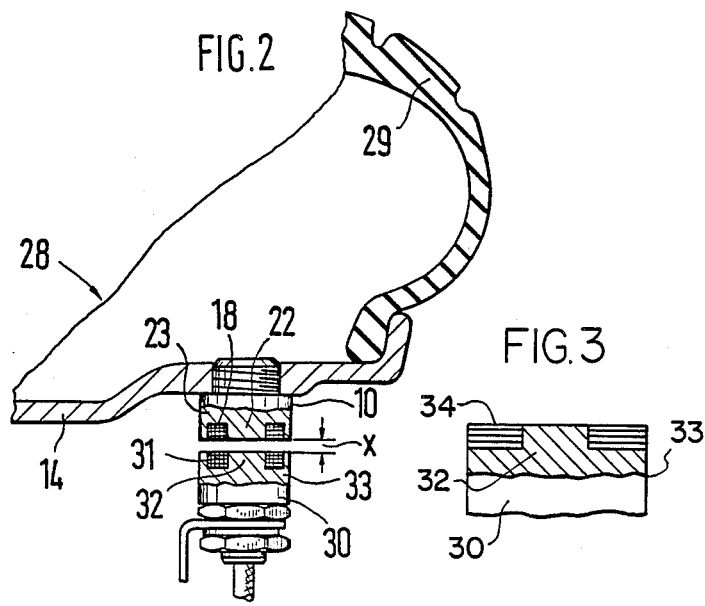

DETECTOR OF INFLATION PRESSURE OF TIRES OF A VEHICLE

BACKGROUND OF THE INVENTION

The invention relates to a tire pressure detector for motor vehicles according to the generic part of the main claim. In a known tire pressure detector (DE-OS N 31 08 998), a reference pressure chamber comprising a diaphragm is sealed relative to the space in the vehicle tire which is under air pressure, wherein the diaphragm simultaneously forms the movable part of a mechanical switch which opens when the checked allowable minimum air pressure in the tire is exceeded. The switch is located in an oscillating circuit with a capacitor and a coil which is arranged at the outwardly directed end of the tire pressure detector on a coil body consisting of insulating material. The coil, which revolves with the tire pressure detector, cooperates with a stationary signal receiver, past which it revolves once in every complete revolution of the wheel, and, in so doing, is penetrated by a high-frequency oscillation of the receiver. When the oscillating circuit of the tire pressure detector is closed, i.e. when the tire pressure is sufficiently high, this oscillation is attenuated each time the tire pressure detector runs past. This attenuation is detected in an evaluating circuit, which is connected with the stationary signal receiver, and an alarm signal is triggered in the evaluating circuit only when it is absent during driving.

It is known, in addition, from DE-OS No. 34 13 209 to construct the stationary signal receiver from a shell-type core with a coil arranged therein, its open side being directed toward the coil of the revolving tire pressure detector.

Since, on the one hand, the energy of the high-frequency oscillation provided by the stationary signal receiver is limited and, on the other hand, the dimensioning of the tire pressure detector must be kept as small as possible, it was necessary in the known solutions to achieve the smallest possible air gap of a few millimeters between the signal receiver and the tire pressure detector. This means a high assembly cost with special adjustment of the individual signal receivers. Moreover, because of imbalance, manufacturing tolerances and the like, the desired small air gap cannot be achieved for longer operating periods with increasing wheel diameters in heavier vehicles.

SUMMARY OF THE INVENTION

It is an object of the present invention to provide an improved pressure detector for vehicle tires.

The present solution attempts to increase the distance of detection by means of an improved coupling of the highfrequency oscillation between the signal receiver and the revolving coil of the tire pressure detector.

The tire pressure detector according to the invention has the advantage that the magnetic coupling can be considerably improved over the known constructions with the same dimensioning of the tire pressure detector by means of the arrangement of the coil on a middle limb of a plate-shaped ferrite core. This results in the additional advantage of a larger possible air gap between the signal receiver and the revolving coil and, accordingly, a larger air gap tolerance and simpler assembly of the signal receiver.

It is particularly advantageous with respect to a good magnetic coupling if the stationary receiver coil is also arranged on a middle limb of a plate-shaped ferrite core. In order to fasten the ferrite core with the coil in the tire pressure detector it is also advantageous if the middle limb comprises an axially continuous opening at which the ferrite core is received by a magnetically inert supporting part in the housing of the tire pressure detector.

The novel features which are considered as characteristic for the invention are set forth in particular in the appended claims. The invention itself, however, both as to its construction and its method of operation, together with additional objects and advantages thereof, will be best understood from the following description of specific embodiments when read in connecton with the accompanying drawings.

BRIEF DESCRIPTION OF THE DRAWING

FIG. 1 shows a tire pressure detector, according to the invention, in a wheel rim in cross section and in an enlarged view;

FIG. 2 shows, in reduced scale, the arrangement of the tire pressure detector on the wheel rim relative to the signal receiver which is arranged so as to be stationary; and FIG. 3 is a partial sectional view of the signal receiver with the signal receiver coil positioned on the middle limb of the ferrite core.

DETAILED DESCRIPTION OF THE PREFERRED EMBODIMENTS

A tire pressure detector, shown on an enlarged scale in FIG. 1, is designated by 10. It is screwed into a threaded borehole 13 of a wheel rim 14 by a threaded projection 11 of its insulating material housing 12. A pressure element 16, for example, a reference pressure chamber, according to DE-OS No. 31 08 998, serving as a switch, which is acted upon by the air pressure in the vehicle tire, is fastened in the insulating material housing 12 in the front in an opening 15 which is directed toward the tire. On the front side remote of the pressure space of the tire, the pressure element 16 is provided with a connection pin 17 at which is fastened one end 18a of a coupling coil 18. The coupling coil 18, together with a capacitor 19, forms an oscillating circuit in which the pressure element 16 is connected. The capacitor 19 is connected with the second end 18b of the coupling coil 18, on the one hand, and with the housing of the pressure element 16 via a conductor 20 on the other hand so as to be electrically conductive.

The coupling coil 18 is arranged with its coil body 21 on a middle limb 22 of a plate-shaped ferrite core 23, the coil body 21 consisting of insulating material. The middle limb 22 is provided with an axially continuous opening 24 in which, on the one hand, a magnetically inert supporting part 25 of plastic engages with a corresponding projection 26 in order to fix the ferrite core 23, and in which, on the other hand, the capacitor 19 is embedded in a sealing compound, not shown. The insulating material housing 12 of the tire pressure detector covers the coupling coil 18 toward the outside with its base 27, which simultaneously fastens the coupling coil 18, the ferrite core 23 and te supporting part 25 axially.

FIG. 2 shows a section of a vehicle wheel 28 with the wheel rim 14 and the tire 29. It can be seen that the tire pressure detector 10 is screwed into an interior area of the rim 14 and is accordingly protected against damage from the outside to a great extent. In addition, a signal receiver 30, which is arranged at the wheel suspension so as to be stationary and whose receiver coil 31 is likewise arranged on a middle limb 32 of plate-shaped ferrite core 33, can also be seen. By means of the selected shape of the ferrite cores 23 and 33, the greatest possible number of lines of flux of a high-frequency oscillation penetrate the coupling coil 18 of the tire pressure detector 10 when the tire pressure detector 10 rotates past the signal receiver 30. Particularly favorable relationships result if the ferrite core 33 of the signal receiver 30, according to FIG. 2, has substantially the same shape as the ferrite core 23 of the coupling coil 18 of the tire pressure detector 10 as shown in FIG. 3. By means of the construction, according to the invention, an air gap x of more than 10 mm can be selected without the functioning ability of the tire pressure monitoring device being jeopardized.

It will be understood that each of the elements described above, or two or more together, may also find a useful application in other types of tire pressure detectors differing from the types described above.

While the invention has been illustrated and described as embodied in a tire pressure detector, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In a tire pressure detector for motor vehicles, comprising an electric oscillating circuit having a coupling coil; a pressure element connected with said circuit in series and acted upon by air pressure in a vehicle tire, the oscillating circuit being fastened at a circumference of a wheel rim; a signal receiver including a signal receiver coil (31), wherein the coupling coil, which revolves with the wheel rim, cooperates with said receiver coil which is located opposite said coupling coil and is arranged in the area of the wheel rim so as to be stationary and sense the oscillation of the oscillating circuit; and an evaluting circuit connected to said signal receiver coil, the improvement comprising a plate-shaped ferrite core (23) having a middle limb (22), the coupling coil (18) being arranged on the middle limb (22) of the plate-shaped ferrite core (23).

2. Tire pressure detector according to claim 1, further including a housing, and a magnetically inert supporting part (25) received in said housing wherein the middle limb (22) has an axially continuous opening (24) at which the magnetically inert supporting part (25) is received by the ferrite core (23).

3. Tire pressure detector according to claim 2, wherein said signal receiver further includes a plate-shaped ferrite core (33) including a middle limb (32), said signal receiver coil (31) being arranged on the middle limb (32) of the plate-shaped ferrite core (33).

4. Tire pressure detector according to claim 1, wherein said signal receiver further includes a plate-shaped ferrite core (33) including a middle limb (32), said signal receiver coil (31) being arranged on the middle limb (32) of the plate-shaped ferrite core (33).

* * * * *